(12) United States Patent
Betran Palomas (10) Patent No.: US 9,523,211 B2
(45) Date of Patent: Dec. 20, 2016

(54) TOWERS (71) Applicant: ALSTOM RENEWABLE TECHNOLOGIES, Grenoble (FR)

(72) Inventor: Jaume Betran Palomas, Sant Cugat del Valles (ES)

(73) Assignee: ALSTOM RENEWABLE TECHNOLOGIES, Grenoble (FR)

( * ) Notice: Subject to any disclaimer, the term of this patent is extended or adjusted under 35 U.S.C. 154(b) by 0 days.

(21) Appl. No.: 14/776,667

(22) PCT Filed: Mar. 20, 2014

(86) PCT No.: PCT/EP2014/055655
§ 371 (c)(1),
(2) Date: Sep. 14, 2015

(87) PCT Pub. No.: WO2014/147202
PCT Pub. Date: Sep. 25, 2014

(65) Prior Publication Data
US 2016/0032608 A1  Feb. 4, 2016

(30) Foreign Application Priority Data
Mar. 21, 2013  (EP) ...................... 13382103

(51) Int. Cl.
*E04H 12/16* (2006.01)
*E04C 5/08* (2006.01)
*E04H 12/34* (2006.01)

(52) U.S. Cl.
CPC ............... *E04H 12/16* (2013.01); *E04C 5/08* (2013.01); *E04H 12/34* (2013.01); *F03D 13/20* (2016.05); *F05B 2240/40* (2013.01); *F05B 2240/912* (2013.01); *Y02E 10/728* (2013.01)

(58) Field of Classification Search
None
See application file for complete search history.

(56) References Cited

U.S. PATENT DOCUMENTS

| | | | | |
|---|---|---|---|---|
| 1,167,354 | A | * | 1/1916 | Crady .................... A47K 3/284 52/148 |
| 4,166,347 | A | * | 9/1979 | Pohlman .................. E04C 3/34 52/223.4 |
| 4,612,750 | A | * | 9/1986 | Maistre .................... B64G 9/00 52/638 |

(Continued)

FOREIGN PATENT DOCUMENTS

DE  20313486 U1 * 11/2003 ............. E04H 12/08
EP       81609 A1 *  6/1983

(Continued)

*Primary Examiner* — Elizabeth A Quast
(74) *Attorney, Agent, or Firm* — Squire Patton Boggs (US) LLP (57) ABSTRACT

Methods and arrangements for controlling the tension of tensioning cables in precompressed towers are disclosed. The towers may comprise a tower section (5), a pair of flanges (15, 15'), a plurality of tensioning cables (10A-10D) and at least one tensioner (30AB, 30CD). The pair of flanges may be arranged around an upper and a lower part of the tower section. The at least one tensioner may be arranged between two of the plurality of tensioning cables (10A-10D). The tensioner may pull the tensioning cables in response to a load signal to increase the tension.

20 Claims, 9 Drawing Sheets

(56) References Cited

U.S. PATENT DOCUMENTS

| | | | | | |
|---|---|---|---|---|---|
| 6,112,756 | A * | 9/2000 | Tseng | ............... | E04H 15/44 135/123 |
| 6,851,231 | B2 * | 2/2005 | Tadros | ............... | E04C 3/22 52/223.14 |
| 7,155,875 | B2 * | 1/2007 | Henderson | ............. | E02D 27/42 52/223.4 |
| 7,343,718 | B2 * | 3/2008 | Foust | ............... | E04C 3/32 264/228 |
| 7,694,486 | B2 * | 4/2010 | Murphy | ............ | B64G 1/222 52/645 |
| 7,765,766 | B2 * | 8/2010 | Gomez | ............ | E04H 12/12 52/742.16 |
| 7,980,814 | B2 * | 7/2011 | Nieuwenhuizen | .... | E04H 12/085 415/1 |
| 8,104,242 | B1 * | 1/2012 | Fouad | ............... | E04C 3/34 52/223.14 |
| 8,919,074 | B2 * | 12/2014 | Meyer | ............ | E04H 12/182 52/123.1 |
| 9,096,985 | B1 * | 8/2015 | Phuly | ............... | E02D 27/42 |
| 2005/0129504 | A1 * | 6/2005 | De Roest | ............ | E04H 12/085 415/4.2 |
| 2009/0142178 | A1 * | 6/2009 | Nieuwenhuizen | .... | E04H 12/085 415/2.1 |
| 2010/0132282 | A1 * | 6/2010 | Voss | ............... | E04C 5/07 52/223.5 |
| 2010/0327488 | A1 * | 12/2010 | Ay | ............... | B28B 13/027 264/312 |
| 2011/0126481 | A1 * | 6/2011 | Stiesdal | ............ | E04H 12/16 52/146 |
| 2011/0138704 | A1 * | 6/2011 | Bagepalli | ............ | E04H 12/12 52/147 |
| 2011/0138707 | A1 | 6/2011 | Bagepalli | | |
| 2014/0033628 | A1 * | 2/2014 | Lockwood | ............ | F03D 11/04 52/223.5 |
| 2014/0260014 | A1 * | 9/2014 | Smith | ............... | E04H 12/16 52/223.1 |
| 2015/0096240 | A1 * | 4/2015 | Arlab N Gabeiras | .. | F03D 11/04 52/40 |
| 2015/0240508 | A1 * | 8/2015 | Revankar | ............ | E04H 3/14 52/6 |

FOREIGN PATENT DOCUMENTS

| | | |
|---|---|---|
| EP | 2182209 | 5/2010 |
| EP | 2339094 | 6/2011 |
| WO | WO 2008136717 | 11/2008 |

* cited by examiner

TOWERS

This application claims the benefit of European Patent Application EP13382103 filed 21 Mar. 2013.

The present disclosure relates to fixed constructions and more specifically to methods and arrangements for controlling the tension of tensioning cables in precompressed tower sections.

BACKGROUND ART

Most existing concrete towers, are pre-compressed (or "pre-stressed") to account for extreme loads, such as winds that may affect the integrity of their structure. Typically these towers have a reinforced concrete column fitted with tensioning cables, such as steel cables. Towers for wind turbines may be steel, concrete or hybrid towers. Hybrid towers may have a lower concrete section and an upper steel section.

Figure 1:
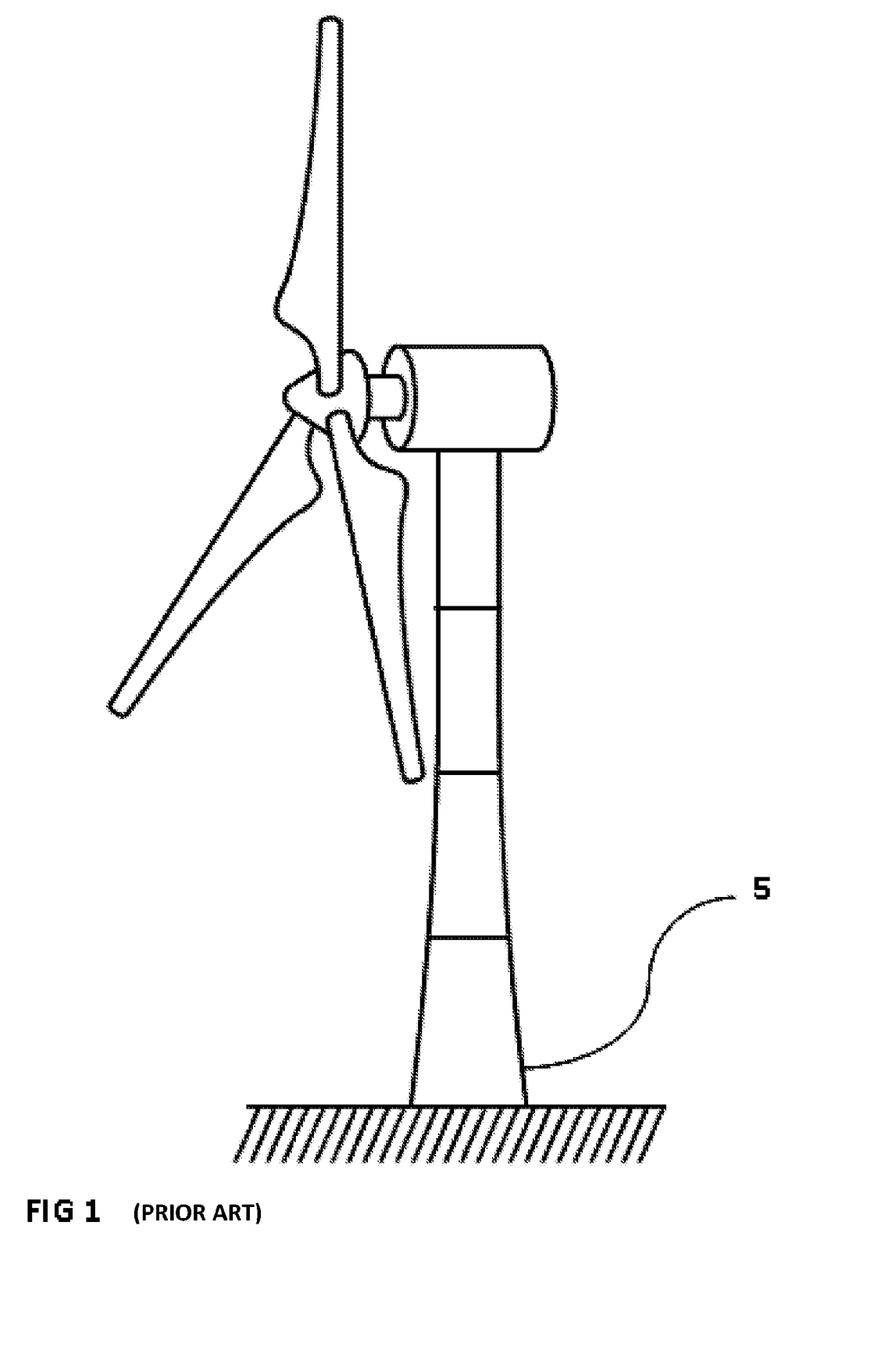
FIG. 1 shows a wind turbine tower.
Figure 2:
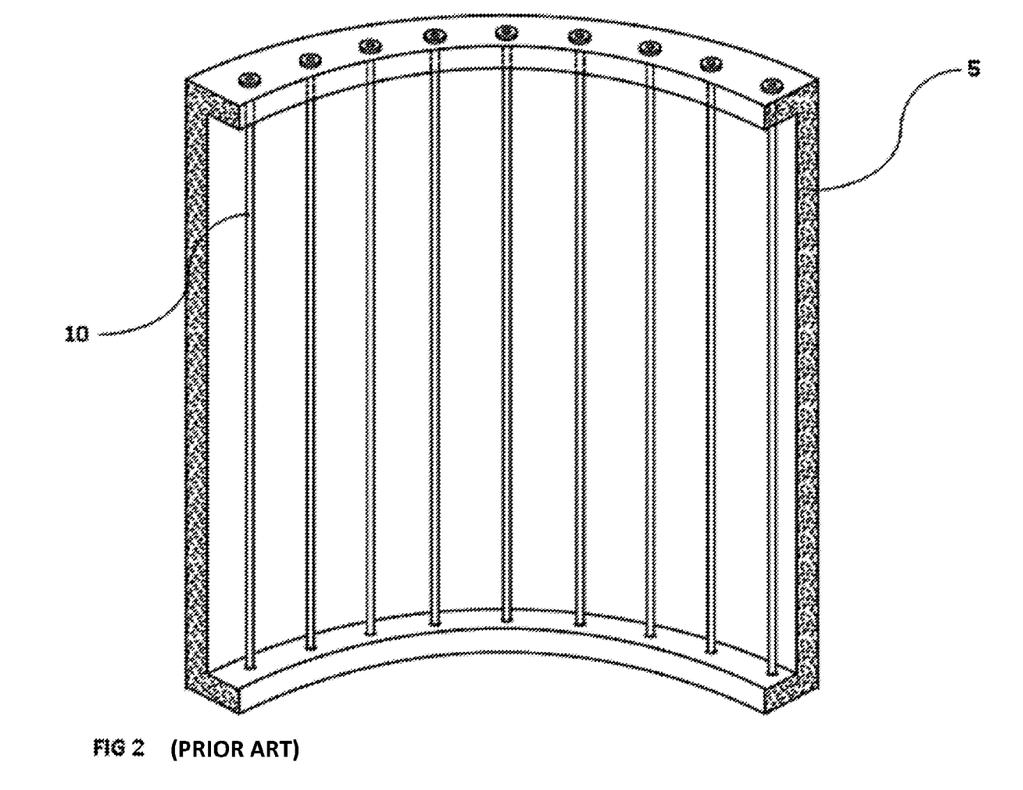
FIG. 2 is a cross-section of a tower section with a typical arrangement of tensioning cables.

FIG. 1 shows a typical wind turbine tower. A concrete tower section has been indicated. FIG. 2 is a cross-section of the tower section of FIG. 1 with a typical arrangement of tensioning cables. The tensioning cables exert a compression on the tower section to to avoid or reduce the possibilities of the concrete section being submitted to tension under the influence of a load, such as a wind load. As the cables must account for extreme events, such as ripples of high wind, the towers are precompressed to withstand loads caused by these extreme events and the cables are accordingly tensioned.

Figure 3:
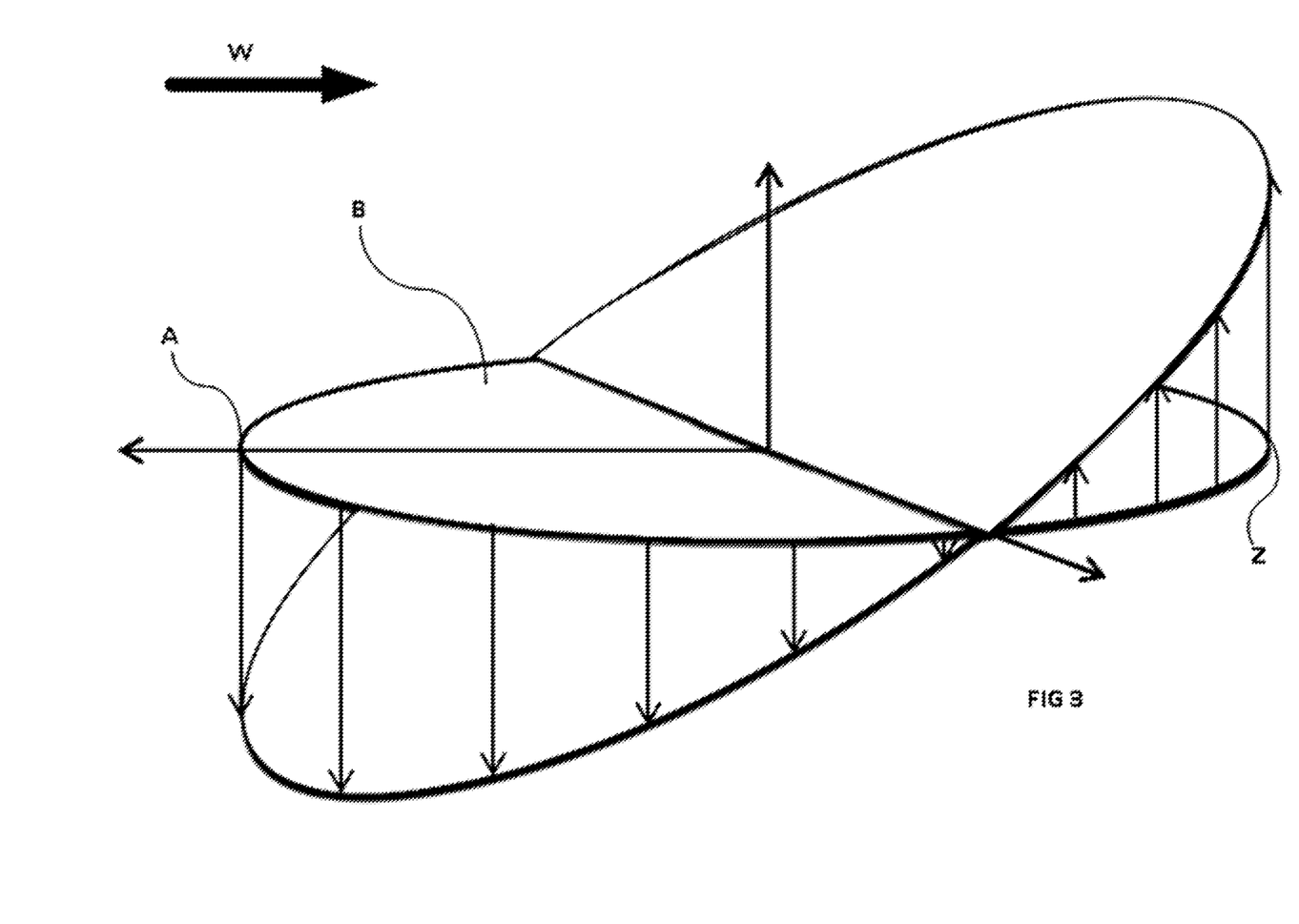
FIG. 3 is an illustration of the positive and negative stresses around the base of a tower under a wind load.

FIG. 3 shows the negative and positive stress distribution in the base of a tower under a wind load. The point suffering the highest negative stress is point A in FIG. 3. This is the windward point at the base of the tower. A tensioning cable at point A must be pre-tensioned to counteract the negative stress caused by wind load W. The tensioning cables may generally be equally pre-tensioned around the base as wind loads may be expected from all sides. As a consequence, when a windward tensioning cable counteracts a wind load, a leeward tensioning cable simply adds compression to the leeward point (point B in FIG. 3) that is already under compression by the wind load. This means that the tower has to be dimensioned to withstand compression that is at least double the compression exerted by the tensioning cables. Consequently, the cross-section of the tower is calculated accordingly. Therefore, large amounts of concrete are required to account for this additional compression. This has a direct impact on the cost of construction of a tower.

SUMMARY OF THE INVENTION

There is a need for a new tower and a new tensioning method that at least partially resolves some of the above mentioned problems. It is an object of the present invention to fulfill such a need.

In a first aspect of the invention a tower is disclosed that may comprise a tower section, a pair of flanges, a plurality of tensioning cables and at least one tensioner. The tower section may have a wall surrounding an inner space. The pair of flanges may extend from the wall and may be arranged around an upper and a lower part of the tower section. Each flange may be arranged with a plurality of cable support elements. The plurality of tensioning cables may extend along the tower section. Each tensioning cable may be attached at one end to a cable support element arranged with the upper flange and at the other end to a cable support element arranged with the lower flange. The at least one tensioner may be arranged between two of the plurality of tensioning cables.

The term "flange" in this respect may be used to denote a tower portion where cables are attached or embedded. Such tower portion may or may not be connecting the tower section with the foundation or with another tower section.

The cable support elements may form part of the flange or may be attached to the flange. An example of a cable support element is a cable terminator. However, any type of element that may support the cable with the flange may be used.

The at least one tensioner may pull the two cables towards each other, thus increasing the tension exerted by each cable. As the tension increases, so does the compression of the respective area of the tower.

In some embodiments, each cable may be coupled to one tensioner. For an even number 2*n of cables, n tensioners are required so that the tension of each pair of cables can be individually set.

In some embodiments, the at least one tensioner may be arranged half-way along the length of each pair of tensioning cables. This arrangement distributes the stress induced to the tensioning cables more evenly between the upper cable support element and the lower cable support element.

In some embodiments, each tensioning cable may be coupled to more than one tensioner. By coupling each tensioning cable to more than one tensioner, the same tension may be achieved with smaller or less potent tensioners.

In some embodiments, the tensioning cables may be arranged in consecutive pairs and the cables of each pair may be coupled to the same tensioners. The resulting tension is then a product of the sum of pulling forces from the plurality of tensors arranged between each pair of tensioning cables. This arrangement may be beneficial if the space between two consecutive cables is limited.

In some embodiments each tensioning cable may be coupled to a first tensioner and to a second tensioner. The first tensioner may be arranged between the tensioning cable and a first neighboring tensioning cable. The second tensioner may be arranged between the tensioning cable and a second neighboring tensioning cable. This arrangement allows a more uniform distribution of tensions between consecutive cables, as the tension of each cable is related to the tension of both neighboring cables.

In some embodiments, the tower may further comprise a controller, coupled to each tensioner, for detecting a load and instructing each tensioner to pull the tensioning cables. The controller may be connected to sensors for detecting a load, such as a wind load caused by a wind ripple. Detecting a load may comprise detecting force and direction of the load. Detecting the direction of the load may determine the principal tensioner, or a principal group of tensioners that needs to be actuated. Detecting the force of the load may determine the pulling force of the principal tensioner or group. A principal tensioner may be defined as the tensioner at the point of the most negative stress due to the detected load. For example, if the load is a bending load caused by a wind ripple, the principal tensioner shall be defined as the tensioner closer to the windward part of the tower section where the most tension in the tower would be expected due to the wind ripple. By contrast, the hindmost tensioner shall be defined as the tensioner closer to the leeward part of the tower section, where the least tension is expected and the most compression will take place due to the wind.

In some embodiments each tensioner may comprise a first cable grip, for gripping the first cable of each pair of cables, a second cable grip for gripping the second cable of each pair of cables, and a tensioning module, attached to said first and second cable grips, for setting the tension of each tensioning cable by pulling the cable grips towards each other. The cable grips may be in the form of sleeves or jackets each firmly surrounding a portion of its respective tensioning cable. One skilled in the art may appreciate that any suitable type of grip for tensioning cables may be used. The grip shall surround the tensioning cable in such a way that it would not slip along the tensioning cable during or after a pulling action by the tensioning module. The tensioning modules may be pistons. However, any type of actuator that can exert a pulling force may be used as a tensioning module without departing from the scope of the invention.

When the tower is a wind turbine tower, then the expected load is a wind load. However, the arrangement of the tensioners may also account for the loads caused by the rotation of the blades or by the rotation of the nacelle.

In another aspect of the invention, a method of setting the tension of tensioning cables in a tower is disclosed. The method may comprise the steps of detecting a load, calculating a desired tension of a pair of consecutive cables for counteracting the load, calculating a pulling force between the consecutive cables for setting the desired tension, and pulling the consecutive cables until the tension is the desired one. The first step may be undertaken by sensors arranged around the tower or even external to the tower. The second and third steps may be undertaken by a controller. The controller may be part of the tower or may be external to the tower. The fourth step may be undertaken by a tensioner. The cables may be pretensioned with a safety tension corresponding to a safety precompression of the tower. This pretensioning may be provided by cable support elements or by tensioners. In the latter case, a minimum pulling force may be applied to the cables by the tensioners to provide the required minimum pretensioning. Finally, when the tower is a wind turbine tower, the load may be a bending load.

BRIEF DESCRIPTION OF THE DRAWINGS

Particular embodiments of the present invention will be described in the following by way of non-limiting examples, with reference to the appended drawings, in which.

DETAILED DESCRIPTION OF EMBODIMENTS

Figure 4:
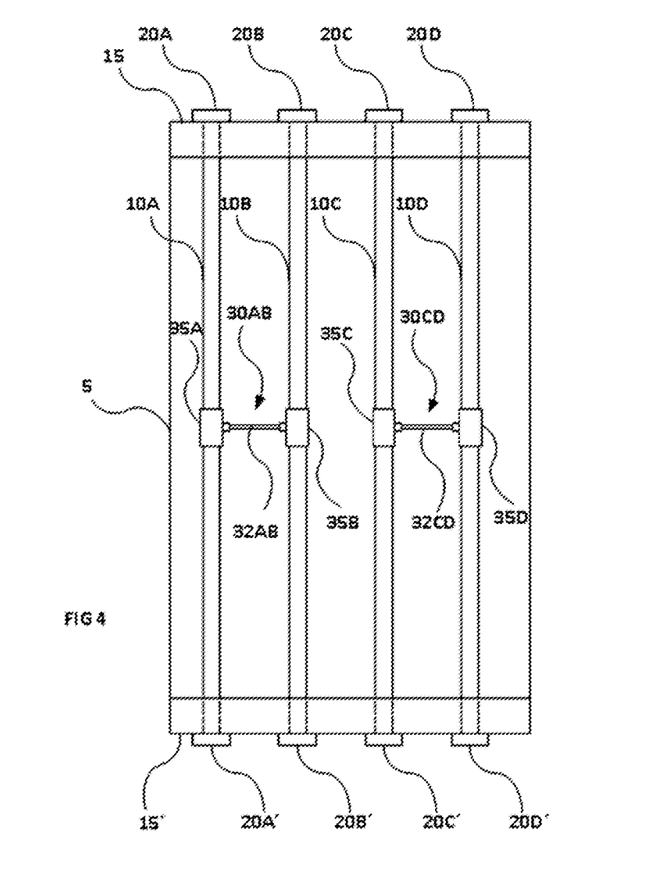
FIG. 4 shows a tensioning cable arrangement according to an embodiment in a relaxed state.

FIG. 4 shows a tensioning cable arrangement according to an embodiment in a relaxed state. A portion of a concrete tower section 5 may include a portion of an upper flange 15 and of a lower flange 15'. A plurality of tensioning cables 10A, 10B, 10C, 10D may be arranged in parallel in the portion of the tower section 5. Each tensioning cable extends along the tower section 5.

Each tensioning cable 10A-10D may be attached at one end to a cable support element 20A-20D of the upper flange 15 and at the other end to a cable support element 20A'-20D' of the lower flange 15'. A first tensioner 30AB is arranged between cables 10A and 10B. A second tensioner 30CD is arranged between cables 10C and 10D. Each of the tensioners 30AB, 30CD comprises a tensioning module 32AB, 32CD and a pair of grips (35A, 35B) and (35C, 35D). During the relaxed state of FIG. 4, the tensioners 30AB and 30CD do not pull cables 10A-10D and the tension the cables exert to tower section 5 is a minimum safety tension. The grips may be in the form of sleeves or jacket, elastically gripping the cables so that they may not slip when the cables are in the relaxed state. Alternatively, the tensioners may exert a limited safety tension during the relaxed state so that the tower is under compression.

Figure 4A:
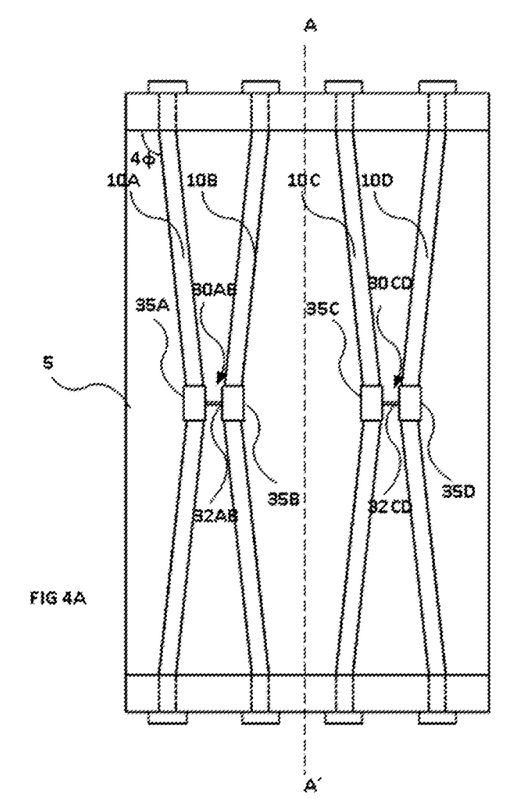
FIG. 4A shows the tensioning cable arrangement of FIG. 4 in an excited state.

FIG. 4A shows the tensioning cable arrangement of FIG. 4 in an excited state. When a load is detected, the tensioners 30AB and 30CD may be instructed to pull the cables 10A-10D so that the tension in the tower section 5 is increased. As shown in FIG. 4A, the tensioning module 32AB is contracted and the distance between grips 35A, 35B is reduced. As a consequence the cables 10A, 10B are pulled closer and the compression they exert on the tower section 5 increases. Accordingly, the tensioning module 32CD is contracted and the distance between grips 35C, 35D is reduced. As a consequence the cables 100, 10D are pulled closer and the compression they exert on the tower section 5 increases.

One skilled in the art may appreciate that a relatively small horizontal pulling force of the tensioners may translate in a high vertical tensioning force at the cables. The arrangement of FIG. 4A shows that the pairs 10A, 10B and 10C, 10D are equally pulled. One skilled in the art may appreciate that this would typically be the case if the windward point was in the middle between cables 10B and 10C, indicated with dashed line A-A'. In other cases, the tension required from each pair may be individually adapted and as a consequence, the distance between the cables of each pair would not be the same.

Furthermore, the distribution of tensioning between pairs of cables may be at the discretion of the tower operator. Therefore, in some cases a higher tension may be desired by a principal tensioner and a lower tension by neighboring tensioners for a certain load, while in other cases a more distributed tensioning between a principal and neighboring tensioners may be desirable.

Figure 5:
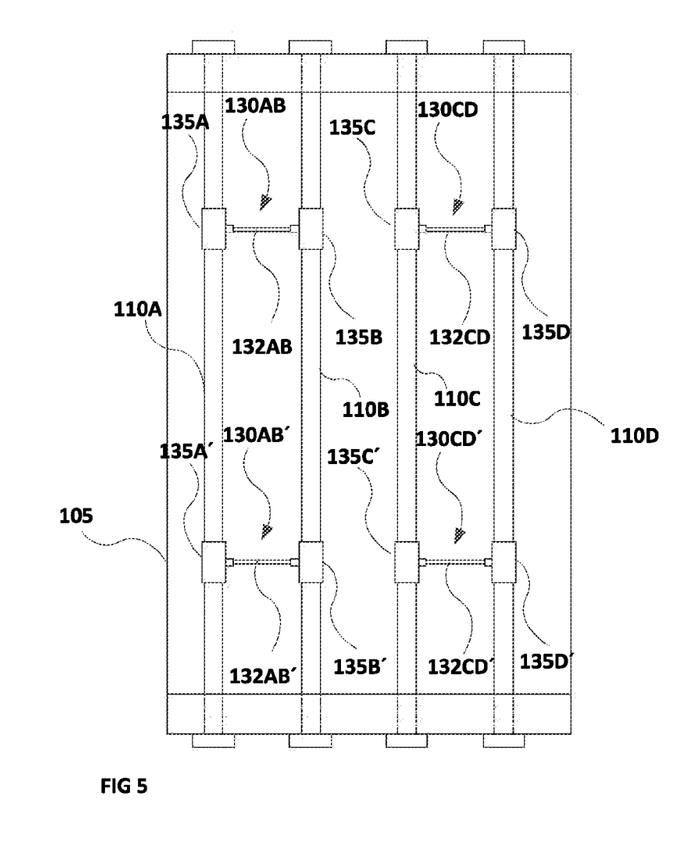
FIG. 5 shows a tensioning cable arrangement according to another embodiment in a relaxed state.

FIG. 5 shows a tensioning cable arrangement according to another embodiment in a relaxed state. In this embodiment two tensioners are arranged between tensioning cables belonging to a pair. A first tensioner 130AB and a second tensioner 130AB' are arranged between cables 110A and 110B. A third tensioner 130CD and a fourth tensioner 130CD' are arranged between cables 110C and 110D. Each of the tensioners 130AB, 130AB', 130CD, 130CD', may comprise a tensioning module 132AB, 132AB', 132CD, 132CD', respectively, and a pair of grips (135A, 135B), (135A', 135B'), (135C, 135D) and (135C', 135D'), respectively. During the relaxed state of FIG. 4, the tensioners do not pull cables 110A-110D and the tension the cables exert to tower section 105 is a minimum safety tension.

Figure 5A:
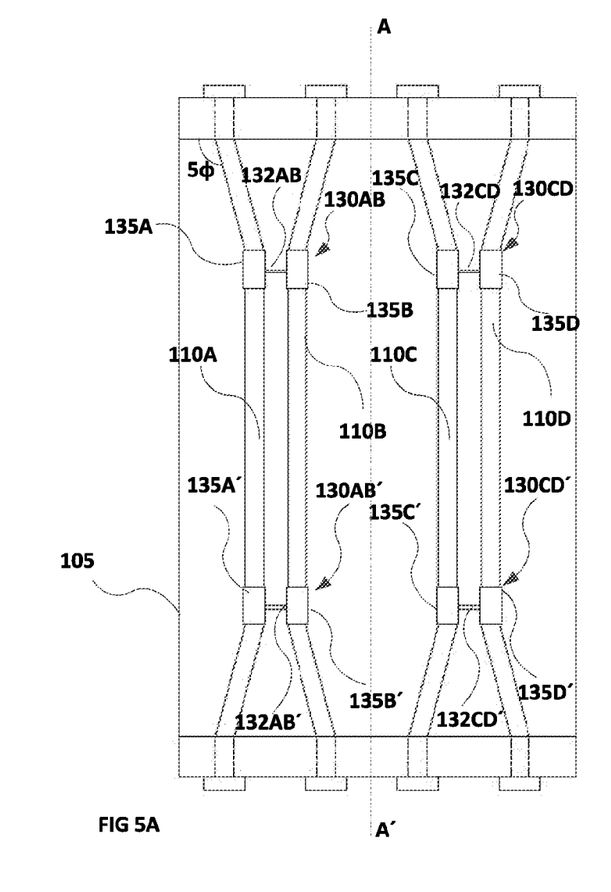
FIG. 5A shows the tensioning cable arrangement of FIG. 5 in an excited state.

FIG. 5A shows the tensioning cable arrangement of FIG. 5 in an excited state. When a load is detected, the tensioners 130AB, 130AB', 130CD, 130CD' are instructed to pull the cables 110A-110D so that the tension in the tower section 105 is increased. As shown in FIG. 5A, the tensioning modules 132AB, 132AB' are contracted and the distance between grips 135A, 135B and 135A', 135B' is reduced. As a consequence the cables 110A, 110B are pulled closer and the compression they exert on the tower section 105 increases. Accordingly, the tensioning modules 132CD, 132CD' are contracted and the distance between grips 135C, 135D and 135C', 135D' is reduced. As a consequence the cables 110C, 110D are pulled closer and the compression they exert on the tower section 105 increases. The arrangement of FIG. 5A shows again that the pairs 110A, 110B and 110C, 110D are equally pulled. Similarly to FIG. 4A, this would ideally be the case if the windward point was in the middle between cables 110B and 110C, indicated with dashed line A-A'. In other cases, the tension required from each pair may be different and as a consequence, the distance between the cables of each pair would not be the same.

Comparing the embodiments of FIG. 4A and FIG. 5A, it may be seen that the contraction of the tensioning modules is the same. However, in FIG. 5A the cables are under higher tension as the angle 59 of each cable to the flange is higher than the corresponding angle 49 of FIG. 4A. As a consequence, with the arrangement of FIGS. 5 and 5A, and using the same type of tensioners, it is possible to have the same tension with smaller pulling force at each tensioner, compared to the arrangement of FIGS. 4 and 4A. Accordingly, it is possible to have a higher tension with the same pulling force. Therefore, the arrangement of FIG. 5, 5A allows the use of smaller or less potent tensioners for achieving the same tension as the one achieved with the arrangement of FIG. 4, 4A.

Figure 6:
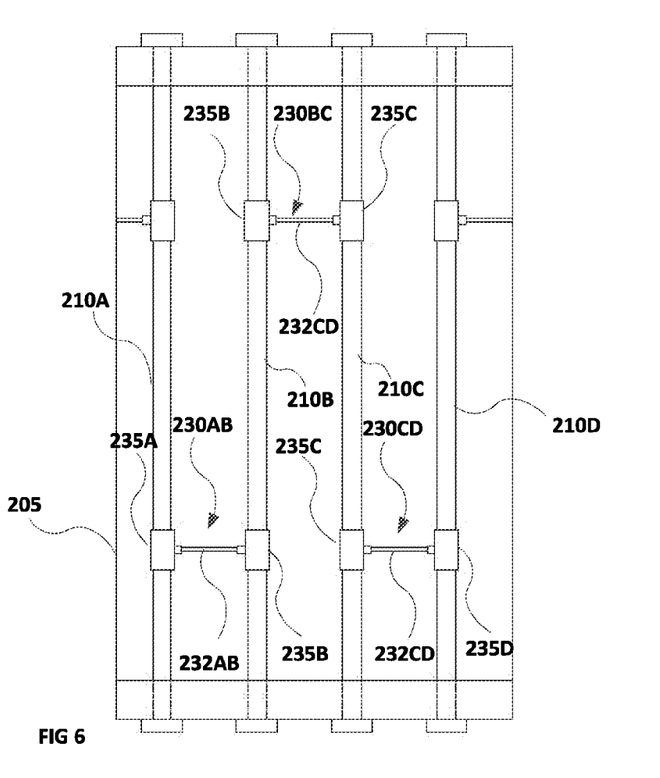
FIG. 6 shows a tensioning cable arrangement according to yet another embodiment in a relaxed state.

FIG. 6 shows a tensioning cable arrangement according to yet another embodiment in a relaxed state. In this embodiment each tensioning cable is coupled to a first tensioner and to a second tensioner. The tensioner 230AB is arranged between tensioning cables 210A, 210B. The tensioner 230BC is arranged between tensioning cables 210B, 210C. The tensioner 230CD is arranged between tensioning cables 210C, 210D. Further tensioners are partially shown arranged between tensioning cable 210A and another cable (not shown) and between tensioning cable 210D and another tensioning cable (not shown). During the relaxed state of FIG. 6, the tensioners do not pull cables 210A-210D and the tension the cables exert to tower section 205 is a minimum safety tension.

Figure 6A:
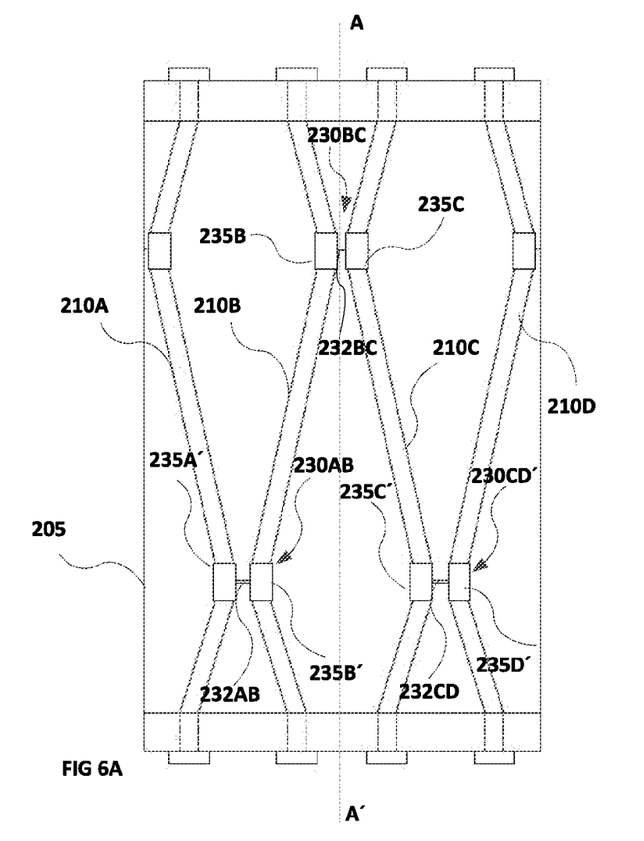
FIG. 6A shows the tensioning cable arrangement of FIG. 6 in an excited state.

FIG. 6A shows the tensioning cable arrangement of FIG. 6 in an excited state. When the tensioning module 232AB is contracted the distance between the respective grips 235A, 235B is reduced. As a consequence the cables 210A, 210B are pulled closer along the line formed by grips 235A, 235B and the compression they exert on the tower section 205 increases. Accordingly, when the tensioning module 232BC is contracted the distance between grips 235B, 235C is reduced. As a consequence the cables 210B, 210C are pulled closer along the line formed by grips 235B, 235C and the compression they exert on the tower section 205 further increases. Finally, when the tensioning module 232CD is contracted the distance between grips 235C, 235D is reduced. As a consequence the cables 210C, 210D are pulled closer along the line formed by grips 235C, 235D and the compression they exert to the tower section 205 increases even further. In FIG. 6A, the contraction of tensioning module 232BC is shown higher than the contraction of tensioning modules 232AB, 232CD which is shown equal among the two. This would be the case if the windward point was in the center between the cables 210B and 210C, indicated with dashed line A-A'.

The arrangement of FIGS. 6, and 6A allows for a more uniform and fine-tuned distribution of tension between the cables, as the tension of each cable may be set by two tensioners, each allowed to exert a different pulling force.

Figure 7:
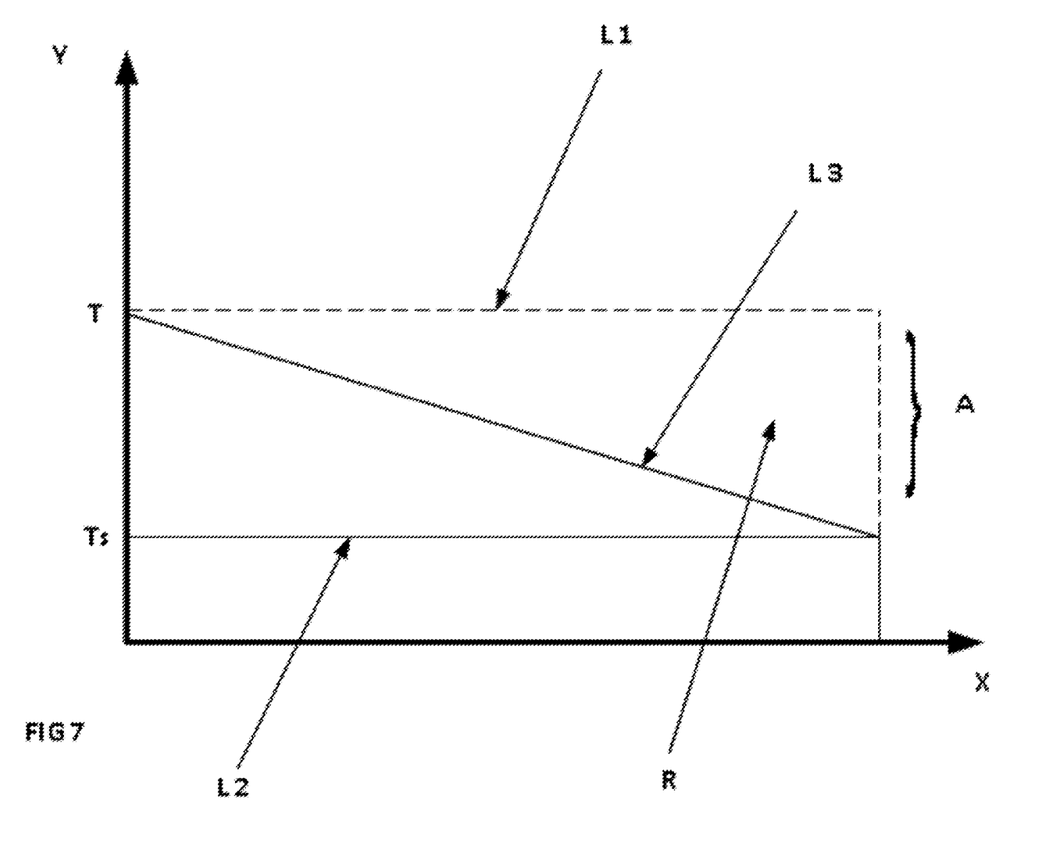
FIG. 7 is a comparative tension diagram.

FIG. 7 is a comparative tension diagram. It illustrates that in examples of the present invention, less tension is required during a relaxed state of a tower, while the appropriate tension is exerted when a load is present. The X axis of the diagram represents the distance from a point of the tower to the most windward point of the tower.

The Y axis represents the tension value. Conventionally, the tensioning cables would exert the tension shown with the dashed line L1. That is, conventionally, all the cables always exert the same tension to the tower as the tension is not controllable and must remain maximum at all times to account for winds in all directions.

In contrast, according to the various examples disclosed herein, in a relaxed state, only a minimum safety tension Ts is required, as depicted with line L2.

Lines L1 and L2 have a tension difference equal to "A" as shown in FIG. 7. During the relaxed state, the tensioners are not pulling any cables. When a load is detected, some of the tensioners around the tower are activated. Those tensioners closer to the windward point exert a higher pulling force leading to a higher tension in the respective cables. Those closer to the leeward point do not exert any pulling force or exert a lower pulling force leading to a lower tension. This is represented by the inclined line L3.

Although the line L3 is shown straight, this is only for illustration purposes. The shape of line L3 may actually vary and be crooked or stepped, based on the number of cables in the tower and their arrangement within the tower, and the tension exerted to each cable or pair of cables by the corresponding tensioners. In general, the starting point may always be higher than the ending point, as illustrated by line L3, i.e. the tension of the cables and the compression they exert on the tower may be higher at the windward side of the tower than at the leeward part. The area R shown in FIG. 7 represents the area of allowable range of cable tension.

Figure 8:
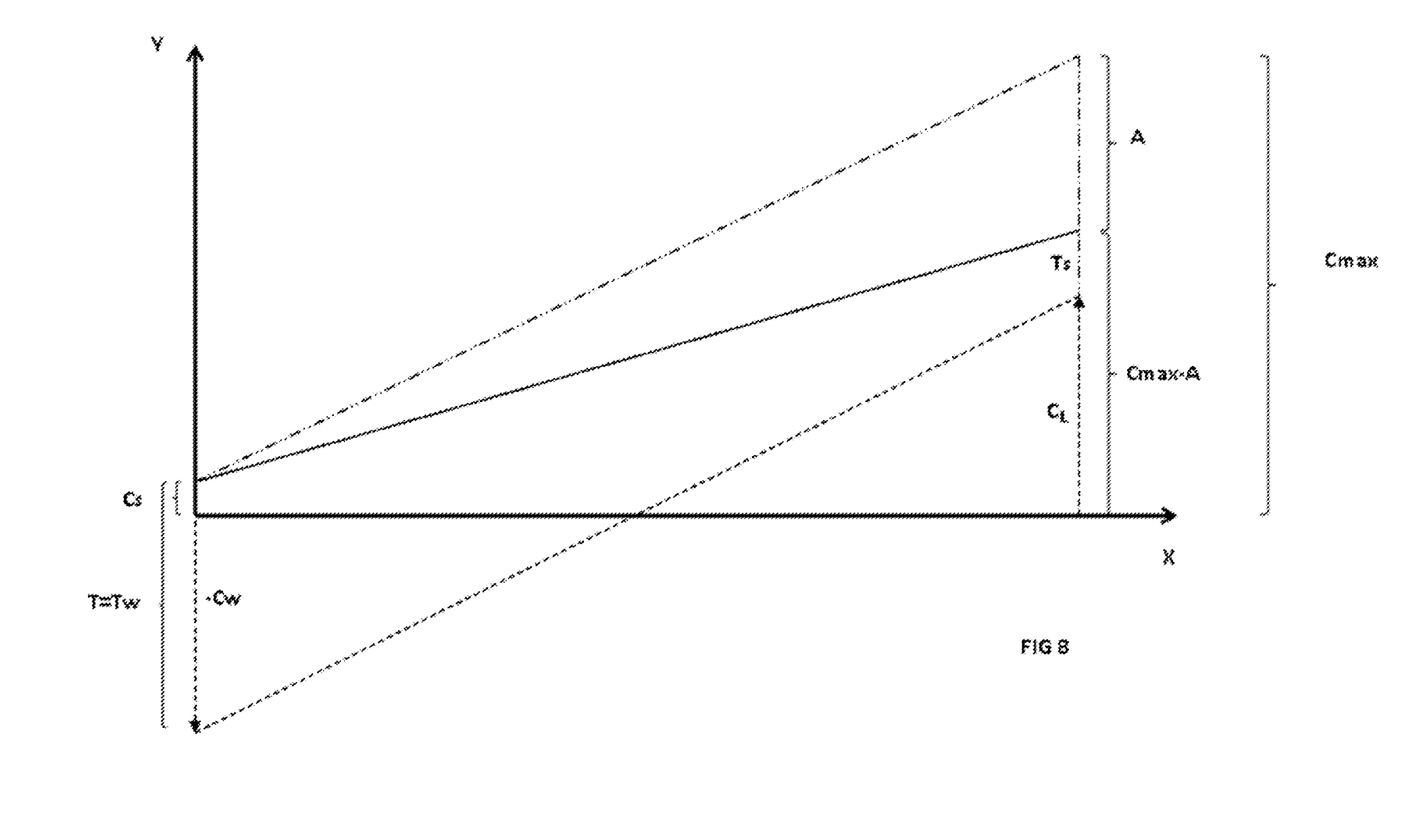
FIG. 8 is a comparative compression diagram.

FIG. 8 is a comparative compression diagram under load. Again, the X axis of the diagram represents the distance from a point of the tower to the most windward point of the tower. The Y axis represents the compression value. The compression of the tower is equal to the sum of cable tension plus compression due to a load.

Closer to the windward point, the compression due to the load is negative, i.e. the tower portion is submitted to tension due to the wind load. In a typical tower without tensioners between cables, the compression is equal to Cs (safety compression). The safety compression which is the sum of the tension T in the cables and the tension due to the wind load-Cw. The tension T in the cables directly determines the compression in the tower section. At the windward point, as a result of the load, the compression of the tower section is reduced to a minimum safety compression.

The tension T of the cables at the windward point must always be above an anticipated maximum-Cw so that a concrete tower section is always under compression.

In a tower in accordance with examples of the present invention, under a certain load W, the total compression is again equal to Cs at the windward point, as the cable tension is lowered from the minimum safety tension Ts to the value Tw (then tension corresponding to a design wind load). Tw may be equal to the value T used in towers without tensioners so that a minimum safety compression Cs remains the same at the windward point.

However, at the leeward point, in a typical tower without tensioners between cables, the compression is equal to Cmax, which is the sum of the tension T of the cables (leading to a compression of equal amount in the concrete tower section) plus compression $C_L$. $C_L$ is the amount of compression at the leeward point due to the load W. In a tower with tensioners according to examples of the present invention, the value of tension T of the cables remains equal to the safety tension Ts at the leeward point (no tensioners are activated). The total compression is then, at the leeward point, equal to $C_L$ plus Ts.

In some implementations, the safety tension Ts may even be reduced, possible even to zero, under a load W, if the minimum safety tension is provided by the tensioners and not by the cable support elements. The minimum compression Cs required for keeping the tower under compression is then provided by the positive stress $C_L$ under a load situation. As may be seen by FIG. 8, the maximum compression is equal to Cmax-A. Therefore the maximum compression at a point around the tower may be reduced by at least a value A when using the tensioners disclosed. Consequently, towers with significantly less concrete may be constructed. Similarly, existing towers can be retrofitted to withstand higher loads than what they were constructed for, or to extend their lifetime by reducing loads.

Figure 9:
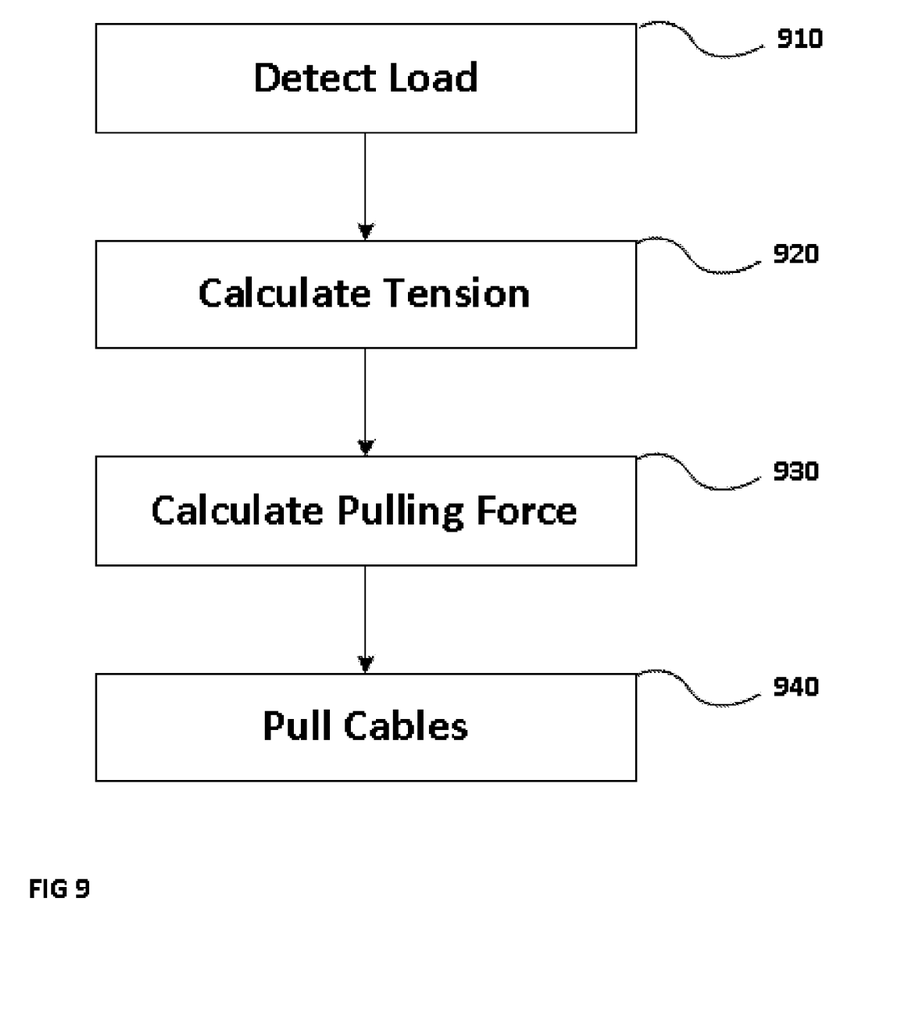
FIG. 9 is a flow diagram of a method according to an embodiment.

FIG. 9 is a flow diagram of a method according to an embodiment. In a first step 910, a load is detected by a sensor. In a next step 920, a desired tension of a tensioning cable is calculated. The desired tension for each cable may be calculated according to the direction of the load and the intensity of the load. In a next step 930, a pulling force of a tensioner is calculated so that the corresponding cable(s) can exert the desired tension. Finally, in step 940, a pair of cables is pulled by a tensioner based on the calculated pulling force. Accordingly, all the required cables are pulled based on the respective pulling force calculated during the previous step for each cable or pair of cables.

The cables may be pretensioned by cable terminators in a relaxed stated, i.e. without a load present, to provide a minimum compression to the tower section. Alternatively, the cables may be pretensioned by tensioners arranged between the cables, pulling the cables to provide the minimum tension required for the minimum compression. In this case, under a load, the tensioners closer to the leeward point may be relaxed, as the minimum compression is provided by the load.

Although only a number of particular embodiments and examples of the invention have been disclosed herein, it will be understood by those skilled in the art that other alternative embodiments and/or uses of the invention and obvious modifications and equivalents thereof are possible. Furthermore, the present invention covers all possible combinations of the particular embodiments described. Thus, the scope of the present invention should not be limited by particular embodiments, but should be determined only by a fair reading of the claims that follow.

The invention claimed is:

1. A tower comprising:
   a tower section having a wall surrounding an inner space, an upper and a lower flange, extending from the wall and being arranged around an upper and a lower part of the tower section, respectively, each flange arranged with a plurality of cable support elements,
   a plurality of tensioning cables, extending along the tower section, each tensioning cable being attached at one end to a cable support element arranged with the upper flange and at the other end to a cable support element arranged with the lower flange, and
   at least one tensioner arranged between two of the plurality of tensioning cables,
   wherein the at least one tensioner comprises a first cable grip, for gripping a first one of the plurality of tensioning cables, a second cable grip for gripping a second one of the plurality of tensioning cables, and an actuator, attached to the first and second cable grips, for setting a tension of the first and second tensioning cables.

2. The tower according to claim 1, further including a plurality of tensioners, wherein each tensioning cable is coupled to a single tensioner of the plurality of tensioners.

3. The system according to claim 2, wherein the plurality of tensioning cables are arranged in pairs and each of the single tensioners is arranged half-way along a length of the respective pair of tensioning cables.

4. The tower according to claim 1, further including a plurality of tensioners, wherein each tensioning cable is coupled to at least one of the plurality of tensioners.

5. The tower according to claim 4, wherein the plurality of tensioning cables are arranged in consecutive pairs and the tensioning cables of each consecutive pair are coupled to the same tensioner.

6. The tower according to claim 4, wherein each tensioning cable is coupled to a pair of tensioners from the plurality of tensioners, whereby
   a first tensioner of the pair of tensioners is arranged between a first tensioning cable and a first neighboring tensioning cable of the plurality of tensioning cables, and a second tensioner of the pair of tensioners is arranged between the first tensioning cable and a second tensioning cable.

7. The tower according to claim 1, further comprising a controller coupled to the at least one tensioner, configured to detect a load and configured to instruct the at least one tensioner to pull the first one and the second one of the plurality of tensioning cables towards each other.

8. The tower according to claim 1, wherein the actuator is configured to set the tension of the first one and the second one of the plurality of tensioning cables by pulling the first and second cable grips towards each other.

9. The tower according to claim 8, wherein the first and second cable grips are in the form of sleeves or jackets each surrounding a portion of the respective first one and the second one of the plurality of tensioning cables.

10. The tower according to claim 8, wherein the actuator is a piston.

11. A wind turbine comprising a tower according to claim 1.

12. A method of setting a tension in tensioning cables of a tower, comprising:
    detecting a load on the tower;
    calculating a desired tension of a pair of consecutive tensioning cables for counteracting the load;
    calculating a pulling force between the consecutive tensioning cables to produce the desired tension;
    attaching a first grip of a tensioner to one of the consecutive tensioning cables;
    attaching a second grip of the tensioner to the other one of the consecutive tensioning cables;
    pulling the consecutive cables with an actuator of the tensioner until the desired tension is reached.

13. The method according to claim 12, further comprising the step of pretensioning the consecutive tensioning cables with a safety tension.

14. The method according to claim 13, wherein the pretensioning comprises the step of applying a minimum pulling force to the consecutive tensioning cables.

15. The method according to claim 12, wherein the load is a bending load.

16. A tensioning cable arrangement for a tower section of a tower, the tower section having a wall surrounding an inner space, the tensioning cable arrangement comprising:
   an upper and a lower flange, to extend from a wall of the tower section and to be arranged around an upper and a lower part of the tower section, respectively, each flange arranged with a plurality of cable support elements,
   a plurality of tensioning cables, to extend along the tower section, each tensioning cable to be attached at one end to a cable support element arranged with the upper flange and at the other end to a cable support element arranged with the lower flange, and
   at least one tensioner arranged between two of the plurality of tensioning cables,
   wherein the at least one tensioner comprises a first cable grip, for gripping a first one of the plurality of tensioning cables, a second cable grip for gripping a second one of the plurality of tensioning cables, and an actuator, attached to the first and second cable grips, for setting a tension of the first and second tensioning cables.

17. The tensioning cable arrangement according to claim 16, further including a plurality of tensioners, wherein each tensioning cable is coupled to a single tensioner of the plurality of tensioners.

18. The tensioning cable arrangement according to claim 16, wherein each tensioning cable is coupled to a plurality of tensioners, the tensioning cables are arranged in consecutive pairs and the tensioning cables of each consecutive pair are coupled to the same tensioner.

19. The tensioning cable arrangement according to claim 16, further including a plurality of tensioners, wherein each tensioning cable is coupled to a first tensioner and to a second tensioner of the plurality of tensioners, whereby
   the first tensioner is arranged between a first tensioning cable and a first neighboring tensioning cable, and a second tensioner is arranged between the first tensioning cable and a second tensioning cable.

20. The tensioning cable arrangement according to claim 16, wherein the actuator is configured to set the tension of the first and second tensioning cables by pulling the first and second cable grips towards each other.

* * * * *